March 18, 1958  A. SCHMALENBACH  2,827,504
PROCESS FOR THE PURIFICATION OF BENZENE
Filed Jan. 27, 1955
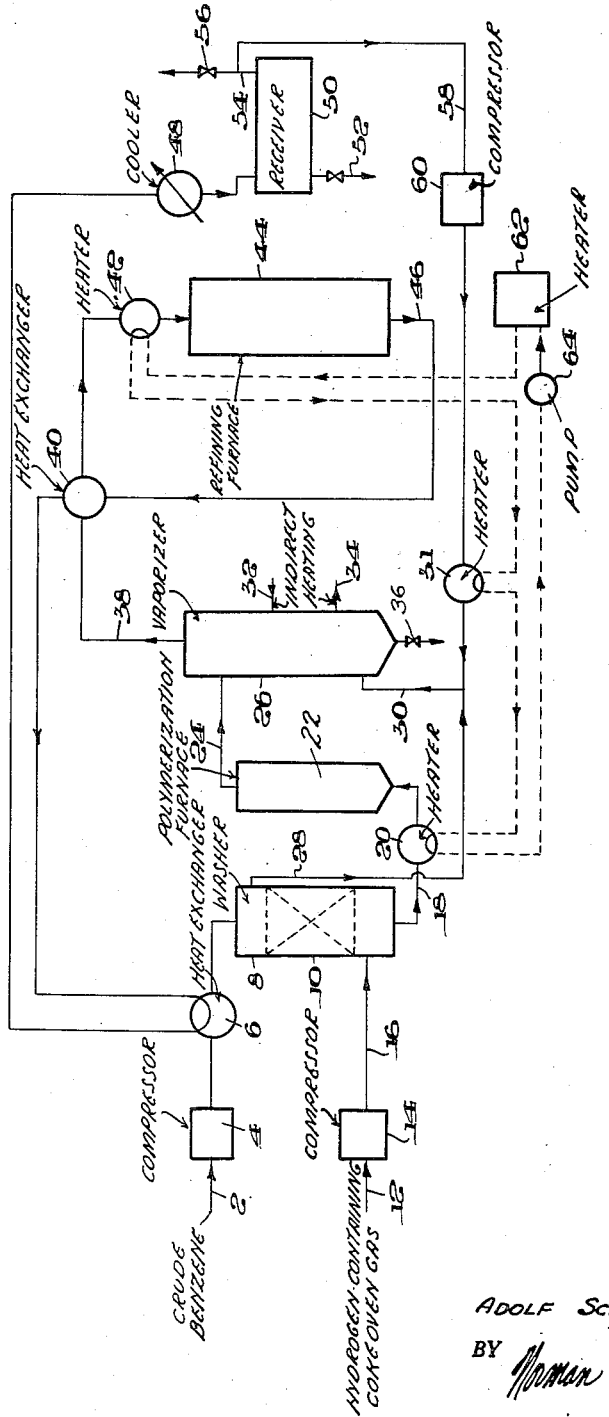
INVENTOR.
ADOLF SCHMALENBACH
BY
his ATTORNEY United States Patent Office 2,827,504
Patented Mar. 18, 1958

2,827,504

PROCESS FOR THE PURIFICATION OF BENZENE

Adolf Schmalenbach, Essen-Stadtwald, Germany, assignor to Koppers Company, Inc., Pittsburgh, Pa., a corporation of Delaware Application January 27, 1955, Serial No. 484,521

6 Claims. (Cl. 260—674)

The present invention relates to a process for the purification of crude benzene by catalytic treatment of crude benzene with hydrogen or a hydrogen-containing gas at increased pressure and increased temperature (pressure refining).

It is known that the impurities present in crude benzene, especially unsaturated, resin-forming hydrocarbons as well as sulfur and nitrogen compounds can be separated by flowing the benzene in the vapor phase with hot hydrogen over suitable catalysts, whereby a saturation of the unsaturated compounds or a hydrogenation of the sulfur and nitrogen compounds to hydrogen sulfide or ammonia is effected. After separation from the impurities of the new compounds formed, a benzene of a high degree of purity is obtained.

This principal process has been carried out in practice by various means, especially with respect to means for heating the benzene and the hydrogen-containing gas to operating temperature.

For example, it has been suggested to heat the crude benzene and the hydrogen-containing gas separately in indirect heaters whereby the essentially hot hydrogen gas is used to vaporize the less heated liquid benzene.

It has been further suggested to mix the hydrogen-containing gas, which can for example be fairly pure hydrogen or coke-oven gas, or the like, with the liquid crude benzene after the compression and to transfer the mixture to an indirect heat exchanger at increased temperature, for example, to a temperature above 180° C.

The first-named method, namely, to heat separately in indirect heat exchangers the benzene and hydrogen gas leads to difficulties when standard coal distillation gas is used as hydrogen-containing gas, which as is known, contains resin-forming constituents, for example, nitric oxide. If coke oven gas is heated, as it is produced in coke plants, indirectly to higher temperatures, for example, to 300° C., incrustations are formed on the walls of the heater which finally lead to an obstruction of the pipelines.

The second named measure, namely, mixing the liquid benzene first with the hydrogen-containing gas and heating the mixture in an indirect heat exchanger has a certain advantage over the first cited process but is not always completely satisfactory. The mixing of the hydrogen gas and liquid benzene can not always be effected so homogeneously that large gas bubbles are not formed which can cause points of local overheating on passing through the indirect heater at which encrustations of high boiling or insoluble materials are deposited which finally cause interruption in operation.

The present invention solves the problem of completely or practically completely preventing depositions which can form on indirect heating both from the hydrogen-containing gas as well as also from the benzene.

The process of the present invention comprises essentially contacting or washing the hydrogen-containing gas, while avoiding any indirect addition of heat to said gas, with hot liquid benzene the temperature of which is higher than that of the gas; separating the hydrogen-containing gas washed with benzene liquid and thereby heated by the benzene liquid without substantially vaporizing the latter; and finally subjecting the benzene to a hydrogenation treatment in the vapor phase in known manner.

By the direct transfer of heat from the hot, but liquid, benzene to the hydrogen-containing gas the temperature of the hydrogen-containing gas is increased on the one hand, and this gas is also simultaneously washed with liquid benzene, whereby the resin-forming constituents in the gas are washed out and are dissolved in the benzene. These resin-forming constituents by subsequent polymerization treatment, the polymerization resulting from the benzene hydrogenation step.

In practice, the direct heat exchange between liquid benzene and the hydrogen-containing gas is, for example, carried out in such manner that the gas is introduced at the bottom of a washer provided with heat-exchange material, or the like, and the hot, liquid benzene is added at the top whereby the gas and liquid flow countercurrently to one another.

A modification of the process of the present invention is illustrated schematically in the accompanying drawing.

The crude benzene is flowed from line 2 into compressor 4 where it is brought essentially to the subsequently operating pressure. After flowing through the heat exchanger 6 the liquid benzene arrives, at a temperature of about 190° C., in the indirect heat exchanger or washer 8. The latter contains a packing 10, for example, Raschig rings, or the like.

The fresh gas, for example, coke oven gas, continuously necessary for the refining is flowed through line 12 through compressor 14 and line 16 at a temperature of about 120° C., into the bottom of washer 8 and comes in contact in packing 10 with the liquid benzene. The temperature of the coke oven gas is thereby increased to 185° to 190° C., whereas the temperature of the benzene falls to 175° to about 170° C. The benzene is withdrawn from the washer through line 18 and is heated to a temperature of 200° C. in heater 20, which is in the circuit along with a diphenyl heater to be described later, and finally flows in polymerization furnace 22 in which the liquid benzene remains for a certain time in order to make possible the formation of high boiling polymers from certain impurities of the benzene. The still liquid benzene is flowed through line 24 into vaporizer 26. In vaporizer 26 the fresh gas withdrawn from washer 8 through line 28 is simultaneously added through line 30. Furthermore, the recirculated coke oven gas or hydrogen gas, which is separated from the purified benzene at the end of the process, and is then again heated in heater 31, is flowed into vaporizer 26 through line 30. The vaporizer is likewise provided with line 32 and line 34 for indirect heating (steam, diphenyl). By the effect of the hot coke oven gas on the one hand and the indirect heating medium on the other, the benzene is vaporized whereby a high boiling product is formed in the bottom of vaporizer 26 which contains the polymer, including a certain amount of benzene, which product is withdrawn through line 36. The mixture of benzene vapors and coke oven gas is withdrawn from the vaporizer through line 38 at a temperature of about 190° and after being heated in heat exchanger 40 and heater 42 is brought to a temperature of 320° C. Thereafter, the mixture of gas and benzene is flowed in the actual contact or refining furnace 44 wherein unsaturated compounds still contained in the benzene as well as the sulfur and nitrogen compounds are hydrogenated. The mixture of vapors leaves the contact furnace through line 46 at a temperature of about 550° C., is passed through through heat exchangers 40 and 6, and finally reaches cooler 48 in which the temperature of the mixture is decreased to such extent that purified benzene is precipitated in liquid form, which is then collected in receiver 50 and can be withdrawn through line 52. The hydrogen-containing gas is withdrawn from receiver 50 through line 54. A part of this gas, after expansion in valve 56 is returned to the main gas line while the greater part is recirculated through line 58 through a compressor 60, heater 31, line 30 and again into vaporizer 26. The heaters 20, 31 and 42 are in the circuit of a heating media circulation system which consists of an organic heating media, for example, diphenyl, which is maintained heated by means of heater 62 and in circulation by means of pump 64.

The term "without substantial vaporization" means, within the scope of the present invention, only the vaporization which would be effected by an addition of indirect heat to direct heat exchanger or washer 8. Such a vaporization is to be maintained optionally small. Independently thereof there naturally occurs a type of evaporation of a part of the benzene by virtue of the saturation by the hydrogen gas flowed through line 16 with the benzene vapors, whereby the overall amount of evaporation primarily depends on the final temperature and amount of hydrogen gas flowed through washer 8. This evaporation is, in fact, unavoidable but does not cause any damage since it does not cause any incrustations in the pipelines or on walls.

The invention claimed is:

1. An improvement in a process for the purification of crude benzene containing unsaturated hydrocarbon and sulfur impurities by polymerizing the impurities which will polymerize to polymers when said crude benzene is maintained at an elevated temperature and pressure for a sustained period of time, removing the benzene and low boiling impurities as vapors from said polymers while leaving said polymers to remain as liquid residue, hydrogenating said vapors, and removing the benzene from the products of said hydrogenation, said improvement comprising treating said crude benzene prior to said polymerizing step by contacting a hydrogen-containing coke oven gas with said crude benzene while said crude benzene is a hot liquid whose temperature is higher than that of the gas and while any indirect transfer of heat to said gas is avoided so that said gas is heated by direct transfer of heat from the liquid to the gas and is washed with the liquid, separating the said gas from said liquid without substantial vaporization of said liquid, and thereafter using said liquid as the crude benzol for said polymerizing and said gas for hydrogenating said vapors.

2. The improvement in accordance with claim 1 wherein the contacting of the hydrogen-containing coke oven gas with the hot, liquid, crude benzene is effected by adding said liquid to a packed washer column at the top thereof, adding said gas to said column at the bottom thereof, and flowing said liquid downwardly and said gas upwardly in said column in countercurrent contact with one another.

3. The improvement of claim 1 wherein the contacting of the hydrogen-containing coke oven gas with hot, liquid, crude benzene is effected by adding said benzene at a temperature of from 190° to 195° C. to the top of a packed washer column, adding said hydrogen-containing gas at a temperature of from 100° to 120° C. to the bottom of said column, and flowing said liquid benzene downwardly and said gas upwardly in said column in countercurrent contact with one another, whereby the temperature of said gas within said column is increased to within the range of from 185° to 190° C. and the temperature of said liquid benzene within said column is simultaneously decreased to within the range of from 175° to 170° C.

4. In a process for the purification of crude benzene containing unsaturated hydrocarbons and sulfur compounds as impurities and comprised of the steps of maintaining said crude benzene in the liquid phase at an elevated temperature and at superatmospheric pressure for a period sufficient to polymerize any polymerizable impurities thereof to resinous compounds of higher boiling point than benzene, vaporizing benzene hydrocarbons and other low boiling constituents while said compound remains in the liquid phase, reacting the vapors so obtained with coke oven gas at an elevated temperature and at superatmospheric pressure and in the presence of a catalyst to hydrogenate any unsaturated hydrocarbons and sulfur compounds contained in the vapors being treated, and thereafter separating benzene from the reaction vapors and catalyst, the improvement which comprises treating said crude benzene prior to the aforesaid first step of polymerizing the polymerizable impurities thereof, by contacting coke oven gas while avoiding any indirect addition of heat to said gas with hot, liquid, crude benzene whose temperature is higher than that of said gas, so that the temperature of said gas is increased by the direct transfer of heat from said hot liquid to said gas and the gas is simultaneously washed with the liquid, separating the washed and heated gas from the liquid without substantial vaporization of the liquid, and effecting the aforesaid last step of hydrogenation with said washed and heated gas.

5. The process in accordance with claim 4 wherein the contacting of the coke oven gas with the hot liquid crude benzene is effected by adding said liquid to a packed washer column at the top thereof, adding said gas to said column at the bottom thereof, and flowing said liquid downwardly and said gas upwardly in said column in countercurrent contact with one another.

6. The process in accordance with claim 4 wherein the contacting of the coke oven gas with the hot, liquid, crude benzene is effected by adding said liquid at a temperature of from 190° to 195° C. to a packed washer column at the top thereof, adding said gas at a temperature of from 100° to 120° C. to said column at the bottom thereof, and flowing said liquid downwardly and said gas upwardly in said column in countercurrent contact with one another, whereby the temperature of the said gas is increased to from about 185° to about 190° C. and the temperature of said liquid is decreased to from 175° to 170° C.

References Cited in the file of this patent

UNITED STATES PATENTS

| 1,932,174 | Gaus et al. | Oct. 24, 1933 |
| 2,063,113 | Morrell | Dec. 8, 1936 |
| 2,701,267 | Urban et al. | Feb. 1, 1955 |

FOREIGN PATENTS

| 431,683 | Great Britain | July 9, 1935 |